SWIMMING POOL COPING AND DECK CONSTRUCTION

Original Filed May 2, 1968 2 Sheets-Sheet 1

INVENTOR
HENRY A. ROZANSKI

BY
Cushman, Darby & Cushman
ATTORNEYS

SWIMMING POOL COPING AND DECK CONSTRUCTION

Original Filed May 2, 1968 2 Sheets-Sheet 2

INVENTOR
HENRY A. ROZANSKI

BY
Cushman, Darby & Cushman
ATTORNEYS

United States Patent Office

Re. 27,669
Reissued June 12, 1973

27,669

SWIMMING POOL COPING AND DECK CONSTRUCTION

Henry A. Rozanski, P.O. Box 127, R.D. 2, Elizabethtown, Pa. 17022

Original No. 3,524,291, dated Aug. 18, 1970, Ser. No. 726,180, May 2, 1968. Application for reissue Apr. 7, 1971, Ser. No. 135,510
Int. Cl. E04h *3/16, 7/18*
U.S. Cl. 52—169 2 Claims

Matter enclosed in heavy brackets [ ] appears in the original patent but forms no part of this reissue specification; matter printed in italics indicates the additions made by reissue.

ABSTRACT OF THE DISCLOSURE

*A swimming pool coping and deck construction wherein a horizontal, elongate coping member of metal or plastic is secured to the top of a swimming pool wall and serves as a finished edge and as a form for concrete decking or as a finished edge for wooden decking. The swimming pool wall, the coping and the deck bond together to support the deck at the swimming pool wall independent of any backfill.*

*BACKGROUND OF THE INVENTION*

[A swimming pool edge construction includes a horizontal tubular coping member of metal or plastic secured to the top of the pool wall for horizontal adjustment and a horizontal deck of concrete or wood adjacent and flush with the top of the coping member. The coping member is sufficiently flexible to be bent to follow gently curving pool edges. Adjustable attachment of the coping to the horizontal top surface of the pool wall is effected by means of a longitudinally extending flange projecting from the coping member and provided with slots for receiving bolts or screws.]

This invention relates to swimming pool edge constructions and in particular to copings for use in such edge constructions.

The edge or border of a swimming pool, that is, the picture-frame structure which engages or forms part of hot top of the vertical pool side wall and cooperates with whatever horizontal deck structure is provided, is generally referred to as a coping. The purpose of a coping is both decorative and functional in that it covers or takes the place of the sharp upper edge of the vertical wall. A variety of coping structures are in use, ranging from rather massive tile, stone or concrete structures used in permanent commercial-type pools to lightweight plastic or metal molding strips. The latter copings are generally used in smaller pools and are provided in a variety of styles which are adapted to be attached to the pool side wall and/or to the surrounding deck by various mechanical means. Usually each style is designed for use with a single type of pool wall structure, such as concrete block, poured concrete, gunite, steel, wood, fiber-reinforced plastic or metal sheet. In addition, with the so-called prefabricated pools, the manufacturer usually makes or has made a specific coping structure which fits only that manufacturer's product.

*Characteristic swimming pool constructions have been disclosed in U.S. Pat. Nos. 1,412,406, 2,881,485, 3,298,-039, 3,310,814, 3,347,006, 3,416,165, 844,391, 1,049,733, 3,016,546 and 3,387,419; in Belgium Pat. No. 650,969 and in a publication by Reynolds Metals entitled, "Designing With Aluminum Extrusions," 1957. Additional pool constructions of interest have been disclosed in U.S. Pat. Nos. 3,069,695, 3,124,905, 3,239,975 and 3,244,284.*

*However, none of the prior art patents have disclosed the combination of a decorative coping affixed to the top of the swimming pool wall to act as a form for concrete decking wherein the coping, swimming pool wall and deck cooperate to support the deck at the swimming pool wall independent of any backfill or other supporting construction.*

*SUMMARY OF THE INVENTION*

It is the primary object of the present invention to provide a simply constructed swimming pool coping which is adapted by virtue of its configuration and material of construction to be attached without modification to a variety of different pool constructions. To this end the coping is formed as an extruded tubular member having an integral flange extending the length of the member and projecting in a horizontal plane for engagement with and attachment to the top of the pool side wall or other flat horizontal surface of the pool structure, so that the tubular body is disposed along the upper inner edge of the vertical pool wall. The flange is provided with spaced-apart elongated slots through which screws, bolts or other fasteners may be inserted to secure the coping to the fixed surface.

The slots in the flange permit horizontal adjustment of the coping relative to the fixed surface in a direction toward or away from the interior of the pool, and this feature is particularly advantageous in an installation where the vertical pool wall is intended to be straight but is wavy or otherwise out of alignment. That is, the elongated coping member need not follow the imperfections in the wall and can be installed in a straight line by sliding the coping member relative to the fixed surface and then tightening the fasteners. The straight coping presents a much more pleasing appearance than a wavy coping and thereby overcomes the decorative disadvantage which is a common problem in some types of pools, such as those having thin, prefabricated walls. The [adjustability of the coping member is further enhanced by the fact that the member is sufficiently flexible in a horizontal plane to permit it to follow the curve of the pool side wall when the pool is of a free-form shape. In addition, the flexibility together with the] slot arrangement permits the member to be installed very simply by inexperienced labor, because the bolt holes need not be located with extreme accuracy.

Another advantageous feature of the coping member is that the configuration lends itself to the inclusion of a snap-in slot adapted to receive and retain the upper edge of a conventional flexible plastic pool liner. Liners of this type have a circumferential bead on the upper edge of the side wall, this bead being adapted to be retained in a slot-like socket provided at the top of the pool side wall so that the liner hangs from its upper edge. The liners are conventionally employed as the watertight compartment of prefabricated wood or sheet metal pools or as a leakproof liner for a concrete pool which has developed leaks. The coping member of the present invention is well suited to the inclusion of an appropriate socket structure in that the socket can be formed in the material of the member and so located as not to interfere with either the decorative or functional features of the member.

The term "tubular" as applied to the coping member is not employed in an exact sense in that the member is not limited to a completely closed configuration.

The invention will be further understood from the following detailed description of several illustrative embodiments in conjunction with the drawings in which:

*DESCRIPTION OF THE PREFERRED EMBODIMENT OF THE INVENTION*

Figure 1:
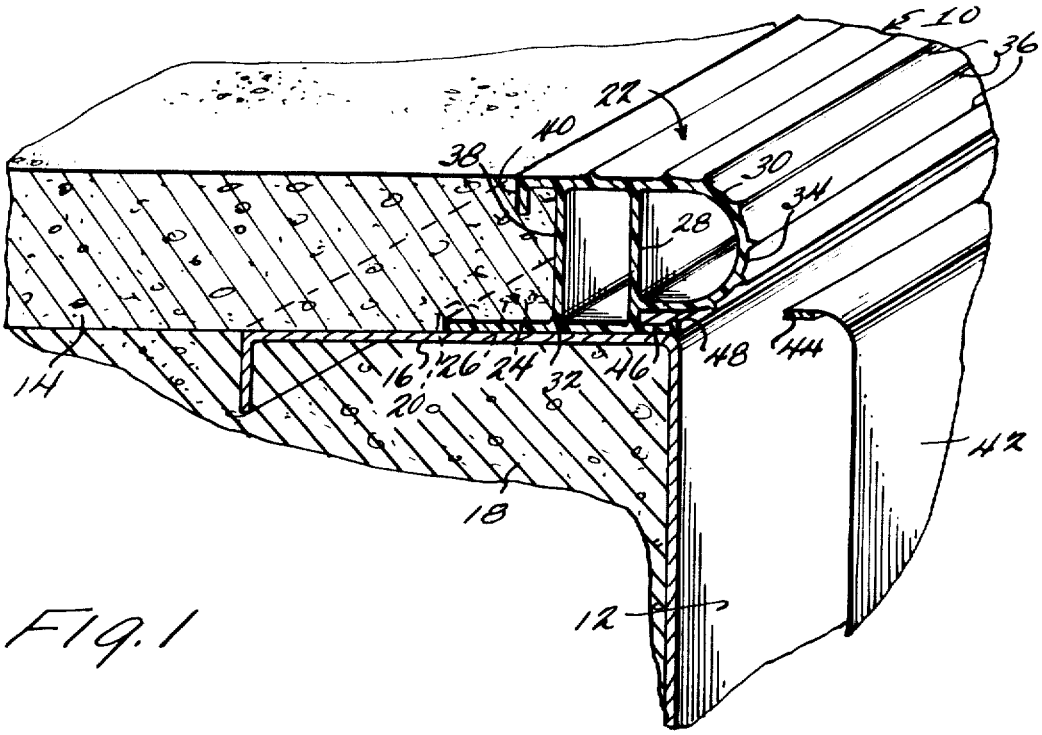
FIG. 1 is a perspective view, broken away, of a swimming pool side wall construction employing a coping member embodying the principles of the present invention in conjunction with a metal side wall and an adjacent concrete deck area.

Referring to FIG. 1, there is shown a coping member 10 embodying the principles of the present invention in its operative position with respect to a typical metal pool side wall 12 and with respect to a typical concrete deck 14 which surrounds the pool. The side wall 12 terminates in an inverted generally channel-shaped configuration which includes a horizontal flange 16 portion resting on top of the ground 18, and the deck 14 is merely a cement slab cast on the ground with an edge resting on top of the flange portion 16 to lock the latter in place.

*The coping member 10 serves as one edge of a form when pouring the deck 14 and may be employed as a screed in conventional manner during the concrete deck construction procedures. In this embodiment, the pool side wall 12 and horizontal flange 16 serve as a continuous footing to support the concrete deck 14 its peripheral connection to the swimming pool.*

The coping member 10 is an elongated tubular member having an integral flange 20 extending along the length of the [tubular] *body* portion 22 and projecting laterally therefrom in a horizontal plane. The coping flange 20 overlies and engages the wall flange 16 and is secured to the latter with a plurality of fasteners, such as bolts 24, which are spaced apart along the length of the flange 20 at, for example, 6-inch intervals. The holes 26 in the latter, through which the bolts 24 pass, are preformed and are elongated in a direction transverse to the flange 20 so that the position of the coping member 10 can be adjusted, within limits, toward and away from the interior of the pool. In the illustrated arrangement the body portion 22 of the member overhangs the pool side wall 12 by a slight amount.

The configuration of the coping member 10, that is, the [tubular] body portion 22 and the [flange 16,] *coping flange 20*, lends itself to fabrication by extrusion so that the member 10 can be made economically and in long lengths which can subsequently be cut at the installation site. The material of construction may be plastic, such as polyvinyl chloride or metal, such as aluminum alloy. It is important that the member 10 have sufficient strength to be self-supporting and yet be sufficiently flexible to permit *limited adjustability at* [it to follow the gentle curve of] the sidewall of a [free-form] pool, and this combination of features is, of course, dependent on the nature of the material, the thickness of the walls of the body portion 22 and of the flange 20 and the shape of these parts in cross section. By proper choice of these variables the member 10 will have the desired strength and flexibility while retaining the basic constructional features which permit use of the member 10 with a wide variety of pool constructions.

In the illustrated embodiment the [tubular] body portion 22 of the coping member 10 includes an internal vertical partition member 28 which divides the interior of the *body portion* [body] 22 into two parts, thereby effecting resistance to collapse of the body *portion* 22 without rendering it inflexible in a horizontal plane. The upper and lower walls 30, 32 of the body portion 22 are horizontal, and the flange 20 is integral with the lower wall 32 so that the entire member 10 rests solidly on the metal wall flange 16. The side wall 34 of the body which faces the pool is convex in order not to present a sharp surface to the swimmers and, as shown, it may exhibit parallel longitudinal ridges 36 which provide a non-skid surface.

The outer side wall 38 of the coping member is shown as being vertical so that it functions as a form against which the concrete slab 14 may be cast. Preferably, the top of the slab 14 is flush with the upper wall 30 of the member 10. In order to lock the slab 14 and the member 10 together the latter may include a depending flange portion 40.

Also shown in FIG. 1 is a conventional flexible plastic swimming pool [lining] *liner* 42 which is adapted to lie against the pool side wall 12 and the bottom wall (not shown). As is typical in liner construction, the upper edge of the liner terminates in a bead 44, usually rectangular in cross section, which is adapted to fit into a slot-like socket structure. The coping member 10 of the present invention is well suited to providing the slot-like socket in that the latter may be formed in the material during the extrusion process and in that the socket will not interfere with the decorative and functional features which are of major importance. In the illustrated embodiment the socket is formed between a lateral flange 46 which extends the length of the member 10 and the lower part of the inner side wall 34. The flange 46 terminates in an upwardly facing lip 48 so that in cross section the socket is complementary to the bead 44 on the liner 42. When the bead 44 is inserted into the socket the liner 42 lies against the pool side wall 12 and is retained in position by friction between the bead 44 and socket generated by the downward pull of the liner 42. Bending of the flange *46*, [48,] which would open up the socket, is prevented by supporting the flange [48] on the metal wall flange 16.

The coping member 10 will generally be fabricated with the liner-retaining socket even though the member 10 will not always be employed with a liner 42. The presence of the socket increases the versatility of the member 10 without adding to its complexity or cost of construction and, in addition, it may be desirable to add a liner at a later time in the event that the pool should develop leaks.

Figure 2:
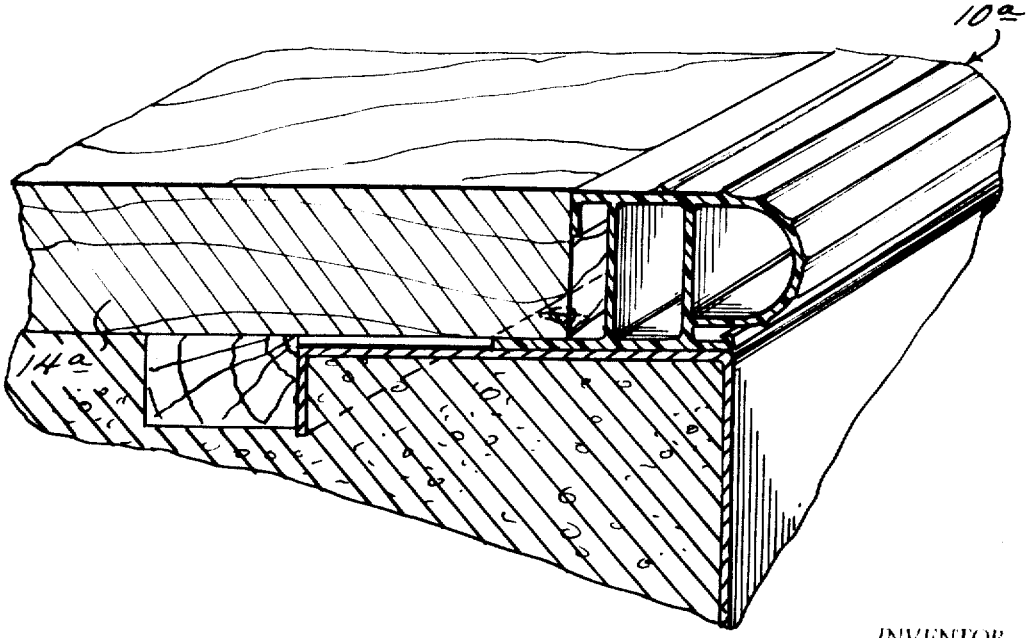
FIG. 2 is a view similar to FIG. 1 illustrating the coping member in conjunction with a wood deck.

FIG. 2 shows generally the same arrangement as FIG. 1 except that in place of a cement deck there is provided a wooden deck 14a which abuts the left side of the coping member 10a.

Figure 3:
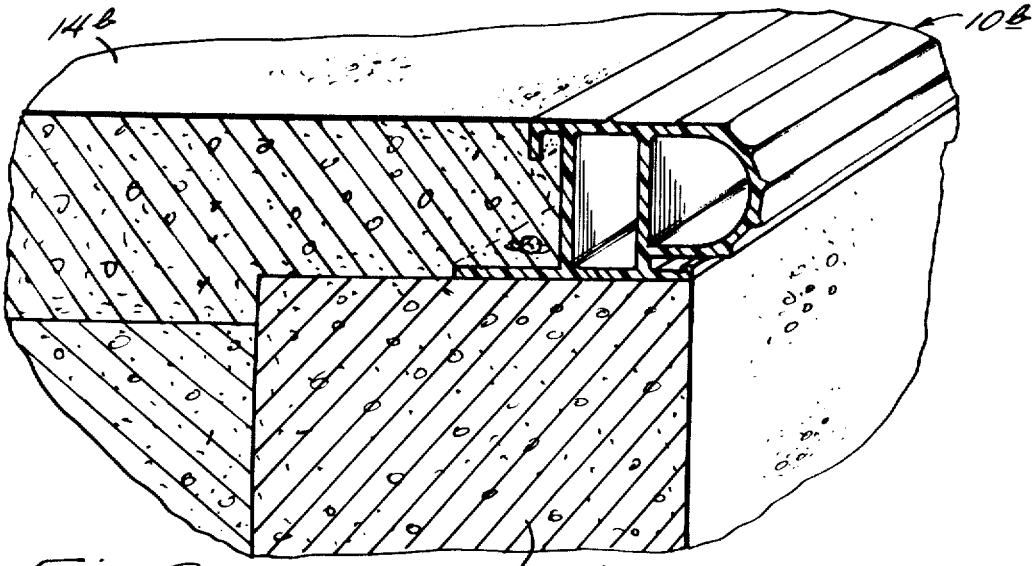
FIG. 3 is a view similar to FIG. 1 illustrating the coping member in conjunction with a typical pool side wall constructed of concrete.

FIG. 3 illustrates an arrangement wherein a coping 10b member having the previously described structure is affixed to the top of a concrete pool side wall 12b. While the deck 14b is shown as concrete it may be wood or any other material.

Figure 4:
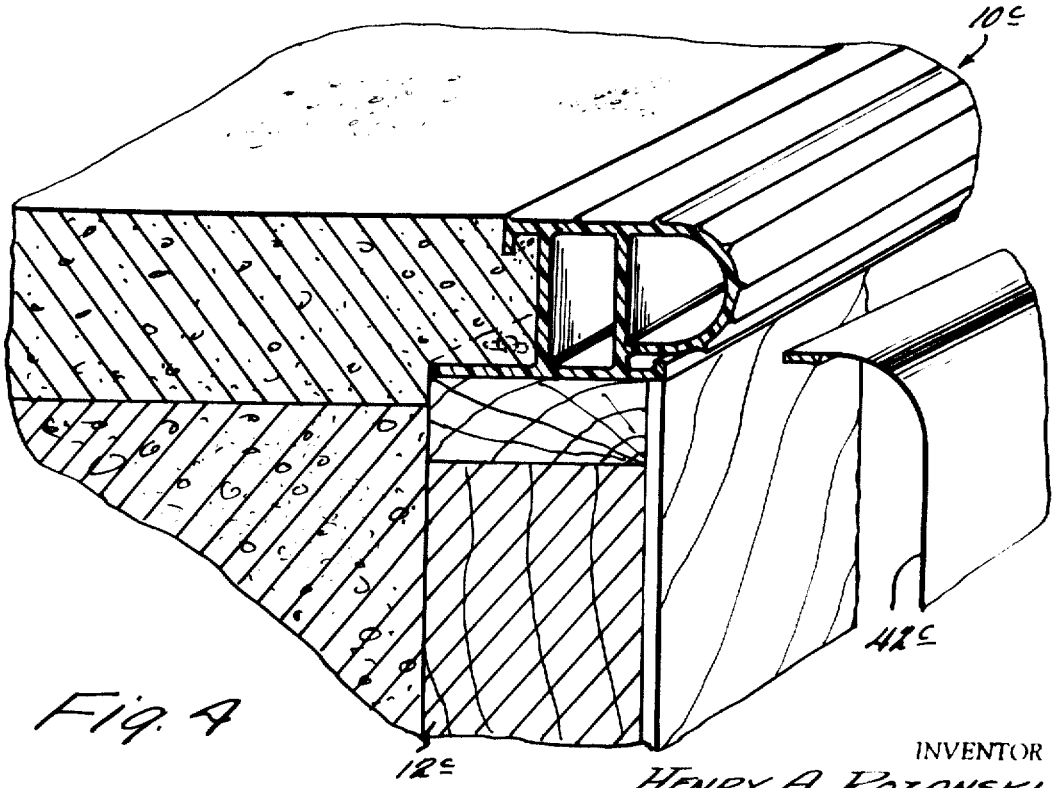
FIG. 4 is a view to similar to FIG. 1 illustrating the coping member in conjunction with a typical wood pool side wall.

FIG. 4 illustrates an arrangement wherein a coping member 10c of the same construction is affixed to the top of a wood side wall 12c. In this construction it will be necessary to employ a liner 42c in order to render the pool watertight.

In assembling any of the illustrated constructions the coping member is first laid along the top of the pool side wall after the latter has been constructed and before the deck is installed. If the pool side wall is curved the member is affixed to the latter by manually bending the member a portion at a time to conform to the curvature of the pool wall and inserting the bolts sequentially as each portion of the coping member is shaped. Additional fine adjustment can then be made before tightening the bolts. The bolt holes may be preformed or formed as needed. If the pool side wall is intended to be straight but is distorted, the coping member is laid out straight and bolted in place in generally the same manner. The slots in the flange are of special advantage in this case because they allow the coping member to extend in a perfectly straight line even though the bolt holes may not all be in a straight line.

After the fasteners have been tightened, the concrete deck or walkway will be poured, using the coping member as a form, or a wood deck or walkway will be installed. In either case and regardless of whether the pool side wall is steel concrete, wood or other material, the side wall supports the edge of the deck and resists sinking of the latter. When the deck is concrete it serves as a bond beam which strengthens the pool side wall and resists deflections of the latter due to freezing ground stresses. The concrete is finished off flush with the top of the coping member, the latter serving as a form during pouring. When the deck is wood the configuration of the coping member, particularly the relationship between the flange portion 16 and the body portion 22, allows the boards to lie flush with the top of the member and still be supported by the pool side wall.

What is claimed is:

[1. A swimming pool edge construction comprising:

a below-ground pool side wall including a vertical wall structure of substantial thickness, the top of said wall structure exhibiting a horizontal upper surface the width of which is substantially equal to the thickness of said wall thickness;

an extruded horizontal coping member extending along said upper surface, said coping member having a generally tubular portion disposed adjacent and at least partially above the inner edge of said upper surface and exhibiting a generally convex external surface facing inwardly toward the interior of the pool, said coping member further including a length-wise flange integral with said generally tubular portion, said flange projecting horizontally outwardly from said generally tubular portion in a direction away from the interior of the pool, the lower surface of said flange engaging said upper surface of said pool wall structure, said coping member being sufficiently flexible and said surfaces being of sufficient width to permit horizontal inward and outward adjustment of said coping member relative to said pool side wall during assembly;

fastening means securing said coping member flange to said upper surface of said pool side wall;

and a generally horizontal unitary deck structure of substantial width disposed at ground level adjacent to and abutting said coping member, the edge portion of said unitary deck structure nearest said coping member overlying said coping member flange and being supported thereon, the upper surface of said deck structure being generally flush with the top of said coping member.]

[2. A swimming pool edge construction as in claim 1 wherein said coping member defines a bead-retaining slot disposed on the opposite side of said generally tubular portion from said coping flange and extending the length of said coping member whereby said member can support a swimming pool liner of the kind having a circumferential bead.]

[3. A swimming pool edge construction as in claim 1 wherein said deck structure is a concrete slab cast in situ on the ground and on said coping flange.]

[4. A swimming pool edge construction as in claim 1 wherein said generally tubular portion of said coping member is circumferentially closed and includes a horizontal bottom wall which is coplanar with said coping flange, said horizontal bottom wall engaging the horizontal upper surface of said pool side wall.]

5. A swimming pool edge construction *comprising*

*(A) a below-ground pool side wall including a vertical wall structure,*

*(1) the said wall structure terminating upwardly in a horizontal upper surface which has an inner edge;*

*(B) an extruded horizontal coping member extending ing along said upper surface,*

*(1) said coping member having a body portion disposed adjacent and at least partially above the inner edge of said upper surface and exhibiting a generally convex external surface facing inwardly toward the interior of the pool,*

*(2) said coping member further including a lengthwise flange integral with said body portion,*

*(a) said flange projecting horizontally outwardly from said body portion in a direction away from the interior of the pool,*

*(b) the lower surface of said flange engaging the upper surface of said pool wall structure,*

*(3) said coping member being sufficiently flexible and said surfaces being of sufficient width to permit limited horizontal inward and outward adjustment of the coping member relative to the said pool wall structure,*

*(4) said coping body portion being circumferentially closed and including a horizontal bottom wall which is coplanar with said coping flange,*

*(a) said horizontal bottom wall engaging the upper surface of said pool wall structure,*

[as in claim 4 wherein] said [tubular] *body* portion [includes] *including* a vertical integral longitudinal partition dividing the interior of said tubular portion into two parellel sections[.]*;*

*(C) fastening means securing said coping member flange to said upper surface of said pool wall structure;*

*(D) and a generally horizontal unitary deck structure of substantial width disposed at ground level adjacent to and abutting said coping member,*

*(1) the edge portion of said unitary deck structure nearest said coping member overlying said coping member flange and being supported thereon,*

*(2) the upper surface of said deck structure being generally flush with the top of said coping member.*

[6. A swimming pool edge construction comprising:

a below-ground pool side wall including a vertical sheet metal wall terminating at its upper edge in a horizontal flange which projects outwardly in a direction away from the pool interior and which is supported from below the ground by an extruded horizontal coping member extending along said side wall flange, said coping member having a generally tubular portion disposed adjacent and at least partially above said side wall flange and exhibiting a generally convex external surface facing inwardly toward the interior of the pool, said coping member further including a length-wise extending flange integral with said generally tubular portion, said flange projecting horizontally outwardly from said generally tubular portion in a direction away from the interior of the pool, the lower surface of said coping flange engaging the upper surface of said side wall flange, said coping member being sufficiently flexible and said surface being of sufficient width to permit horizontal inward and outward adjustment of said coping member relative to said pool side wall during assembly;

fastening means securing said coping flange to said upper surface of said pool side flange; and a generally horizontal unitary deck structure of substantial width disposed at ground level adjacent to and abutting said coping member, the edge portion of said unitary deck structure nearest said coping member overlying said coping flange and being supported thereon, the upper surface of said deck structure being generally flush with the top of said coping member.]

[7. A swimming pool edge construction as in claim 6 wherein said coping member defines a bead-retaining slot disposed on the opposite side of said generally tubular portion from said coping flange and extending the length of said coping member whereby said member can support a swimming pool liner of the kind having a circumferential bead.]

[8. A swimming pool edge construction as in claim 6 wherein said deck structure is a concrete slab cast in situ on the ground and on said coping flange.]

[9. A swimming pool edge construction as in claim 6 wherein said generally tubular portion of said coping member is circumferentially closed and includes a horizontal bottom wall which is coplanar with said coping flange, said horizontal bottom wall engaging the horizontal upper surface of said pool side wall.]

[10. A swimming pool edge construction as in claim 9 wherein said tubular portion includes a vertical integral longitudinal partition dividing the interior of said tubular portion into two parallel sections.]

*11. In a construction for finishing the top periphery of a swimming pool having an enclosing wall which has an inner face which faces inwardly, an outer face which faces outwardly and which terminates near ground level in an upper flat surface, the combination of*

*(A) a coping member secured to the upper flat wall surface,*

*(1) said coping extending about the periphery of the swimming pool in registry over the wall,*

*(2) said coping member having elongated body construction which comprises an upper wall, a lower wall and a curved side wall interconnected therebetween,*

*(a) the said side wall integrally forming a smooth, convex continuation with the upper wall,*

*(b) said side wall terminating downwardly in a junction with the lower wall wherein a portion of the side wall overlies a portion of the lower wall over the said wall inner face inwardly from the junction,*

*(.1) the said side wall and said lower wall defining a slot-like socket structure therebetween inwardly from the junction,*

*(c) the said coping lower wall resting upon and being secured to the upper flat wall surface,*

*(d) said coping lower wall extending outwardly to form an integral flange,*

*(.1) said flange resting upon the said upper flat wall surface, and*

*(.2) said flange and said upper wall outwardly defining an elongated opening[.]*

*(B) a concrete deck construction surrounding at least a part of the top periphery of the swimming pool,*

*(1) said deck construction having an inwardly facing edge and an outwardly facing edge,*

*(a) said inwardly facing edge inserting into the elongated opening,*

*(b) said pool enclosing wall supporting the inwardly facing edge;*

*(c) said coping member and deck construction forming a bond beam with the pool side wall to strength the side wall and to resist deflection.*

References Cited

The following references, cited by the Examiner, are of record in the patented file of this patent or the original patent.

UNITED STATES PATENTS

| | | | |
|---|---|---|---|
| 3,335,429 | 8/1967 | Arp | 52—169 |
| 1,412,406 | 4/1922 | Hodgson | 52—179 |
| 2,881,485 | 4/1959 | Hyman | 52—179 |
| 3,298,039 | 1/1967 | Schmerler | 52—169 |
| 3,310,814 | 3/1967 | Lipman | 52—169 |
| 3,347,006 | 10/1967 | Fox | 52—300 |
| 3,416,165 | 12/1968 | Pereira | 52—169 |
| 844,391 | 2/1907 | Nichols | 52—255 |
| 1,049,733 | 1/1913 | Knapp | 52—255 |
| 3,016,546 | 1/1962 | Lerner | 52—169 |
| 3,387,419 | 6/1968 | Kanberg et al. | 52—255 |

FOREIGN PATENTS 650,969 1964 Belgium.

OTHER REFERENCES

Designing With Aluminum Extrusions—by Reynolds Metals, 1957.

HENRY C. SUTHERLAND, Primary Examiner

U.S. Cl. X.R.

4—172.21; 52—288, 300